United States Patent
Wang

(10) Patent No.: US 12,463,540 B2
(45) Date of Patent: Nov. 4, 2025

(54) SWITCHING MODE POWER SUPPLY WITH IMPROVED POWER BALANCE AND THE METHOD THEREOF

(71) Applicant: Chengdu Monolithic Power Systems Co., Ltd., Chengdu (CN)

(72) Inventor: Siran Wang, Hangzhou (CN)

(73) Assignee: Chengdu Monolithic Power Systems Co., Ltd., Sichuan (CN)

( * ) Notice: Subject to any disclaimer, the term of this patent is extended or adjusted under 35 U.S.C. 154(b) by 50 days.

(21) Appl. No.: 17/983,342

(22) Filed: Nov. 8, 2022

(65) Prior Publication Data

US 2023/0170807 A1    Jun. 1, 2023

(30) Foreign Application Priority Data

Nov. 26, 2021  (CN) .......................... 202111427649.8

(51) Int. Cl.
H02M 3/335   (2006.01)
H02M 1/00    (2006.01)

(52) U.S. Cl.
CPC ..... H02M 3/33561 (2013.01); H02M 1/0029 (2021.05); H02M 3/33592 (2013.01)

(58) Field of Classification Search
CPC .......... H02M 3/22; H02M 3/24; H02M 3/285; H02M 3/315; H02M 3/3155; H02M 3/335; H02M 3/33507; H02M 3/33515; H02M 3/33523; H02M 3/3353; H02M 3/33538; H02M 3/33546; H02M 3/33553; H02M 3/33561; H02M 3/33569; H02M 3/33571; H02M 3/33573; H02M 3/33576; H02M 3/33584; H02M 3/33592; H02M 1/0003; H02M 1/0025; H02M 1/0029; H02M 1/0038; H02M 1/0067; H02M 1/008; H02M 1/009
USPC ........ 363/13–21.18, 65, 76, 84–94; 323/234, 323/267, 268, 271–275, 280, 282–287, 323/351
See application file for complete search history.

(56) References Cited

U.S. PATENT DOCUMENTS

| | | | |
|---|---|---|---|
| 10,432,104 B2 | 10/2019 | Li et al. | |
| 10,673,344 B2 | 6/2020 | Wang | |
| 10,784,791 B2 | 9/2020 | Feng | |
| 10,879,810 B2 | 12/2020 | Zhang | |
| 10,951,124 B2 | 3/2021 | Li et al. | |
| 11,031,877 B2 | 6/2021 | Miao | |
| 11,245,327 B2 | 2/2022 | Feng et al. | |

(Continued)

OTHER PUBLICATIONS

U.S. Appl. No. 17/521,000, filed Nov. 8, 2021, Chengdu Monolithic Power Systems.

Primary Examiner — Thienvu V Tran
Assistant Examiner — Carlos O Rivera-Perez
(74) Attorney, Agent, or Firm — Perkins Coie LLP

(57) ABSTRACT

A switching mode power supply with improved power balance is discussed. It has a transformer, a primary circuit having a primary power switch coupled to a primary side of the transformer, and a plurality of secondary circuits coupled in parallel with each other at a secondary side of the transformer. A plurality of output voltages are provided at each of the secondary circuits; and each of the secondary circuits has a secondary power switch. If any of the output voltage deviates from a reference voltage, an ON time length of the corresponding secondary power switch is extended.

10 Claims, 4 Drawing Sheets

(56) References Cited

U.S. PATENT DOCUMENTS

| | | |
|---|---|---|
| 11,381,151 B2 | 7/2022 | Ye et al. |
| 2011/0032732 A1* | 2/2011 | Hsu .................. H02M 3/33561 363/21.14 |
| 2014/0146577 A1* | 5/2014 | Uno ........................ H02M 3/01 363/21.02 |
| 2017/0079099 A1* | 3/2017 | Wu ...................... H05B 45/382 |
| 2020/0153350 A1* | 5/2020 | Yoshimitsu ....... H02M 3/33592 |
| 2020/0220464 A1* | 7/2020 | Liu ......................... H02M 1/32 |

\* cited by examiner

SWITCHING MODE POWER SUPPLY WITH IMPROVED POWER BALANCE AND THE METHOD THEREOF

CROSS-REFERENCE TO RELATED APPLICATIONS

This application claims priority to and the benefit of Chinese Patent Application No. 202111427649.8, filed Nov. 26, 2021, which is incorporated herein by reference in its entirety.

FIELD

The present invention relates to electronic circuits, more specifically, the present invention relates to switching regulators and the control thereof.

BACKGROUND

Switching regulators used in house appliances mostly adopt two or more outputs. For example, in the application of range hood, the loads of the range hood comprise a motor fan, a timer, a light, and etc. As the functions of house appliances become more and more complex in recent years, the power supply requirement goes up considerably, which also sets forth a higher requirement with the power conversion efficiency of the switching regulators.

Synchronous rectification (SR) has remarkable advantage in the efficiency control of power conversion. The SR uses a controllable power switch (e.g. a MOSFET) to replace a power diode to co-operate with a main power switch in a power stage, so as to convert the input voltage into a desired output voltage. Because the controllable power switch has lower ON resistance, the power consumption with controllable power switch is lower, which brings higher efficiency.

However, SR is seldom used in the switching regulators having more than one outputs (i.e., multi-outputs). How to control balance between different outputs is a problem faced in the field.

SUMMARY

In accordance with an embodiment of the present invention, a switching mode power supply is discussed. The switching mode power supply comprises: a primary circuit, a first secondary circuit, a second secondary circuit, and a control circuit. The primary circuit is configured to receive an input voltage, and has a main power switch coupled to a primary winding. The first secondary circuit is configured to provide a first output voltage, and has a first secondary power switch coupled to a first secondary winding. The second secondary circuit is configured to provide a second output voltage and has a second secondary power switch coupled to a second secondary winding. The control circuit is configured to detect whether the first output voltage or the second output voltage deviates from a reference voltage, or whether both the first output voltage and the second output voltage deviate from a reference voltage.

In addition, in accordance with an embodiment of the present invention, a switching mode power supply is discussed. The switching mode power supply comprises: a primary circuit, configured to receive an input voltage, the primary circuit having a main power switch coupled to a primary winding; n secondary circuits, configured to respectively provide an output voltage, wherein n is an integer equal to or higher than 2, and each of the n secondary circuits having a secondary power switch coupled to a corresponding secondary winding; and a control circuit, configured to detect whether one or more of the n output voltages deviate from a reference voltage.

Furthermore, in accordance with an embodiment of the present invention, a method used in a switching mode power supply is discussed. The switching mode power supply includes a transformer, a primary circuit coupled to a primary side of the transformer, and a plurality of secondary circuits coupled in parallel with each other at a secondary side of the transformer. The primary circuit has a primary power switch, and each of the secondary circuits has a secondary power switch. The method comprising: periodically turning on the primary power switch, to deliver an input voltage to the secondary side; freewheeling a current by way of each of the secondary power switches during an OFF period of the primary power switch, to generate an output voltage at each of the secondary circuits; monitoring each of the output voltages to detect whether there is an output voltage or more than one output voltages deviate from a reference voltage; and extending an ON time length of the corresponding secondary power switch if one or more output voltages deviate from the reference voltage.

The use of the similar reference label in different drawings indicates the same of like components.

DETAILED DESCRIPTION

Embodiments of circuits for switching mode power supply are described in detail herein. In the following description, some specific details, such as example circuits for these circuit components, are included to provide a thorough understanding of embodiments of the invention. One skilled in relevant art will recognize, however, that the invention can be practiced without one or more specific details, or with other methods, components, materials, etc.

The following embodiments and aspects are illustrated in conjunction with circuits and methods that are meant to be exemplary and illustrative. In various embodiments, the above problem has been reduced or eliminated, while other embodiments are directed to other improvements.

Figure 1:
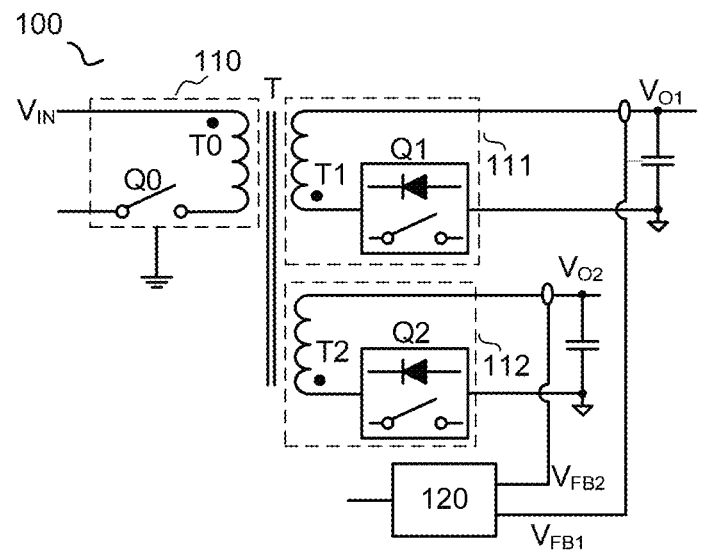
FIG. 1 schematically shows a switching mode power supply 100 in accordance with an embodiment of the present invention.

FIG. 1 schematically shows a switching mode power supply 100 in accordance with an embodiment of the present invention. In the example of FIG. 1, the switching mode power supply comprises: a primary circuit 110, a first secondary circuit 111, a second secondary circuit 112, and a control circuit 120. The primary circuit 110 is configured to receive an input voltage $V_{IN}$, and has a main power switch Q0 coupled to a primary winding T0. The first secondary circuit 111 is configured to provide a first output voltage $V_{O1}$, and has a first secondary power switch Q1 coupled to a first secondary winding T1. The second secondary circuit 112 is configured to provide a second output voltage $V_{O2}$ and has a second secondary power switch Q2 coupled to a second secondary winding T2. The control circuit 120 is configured to detect whether the first output voltage $V_{O1}$ or the second output voltage $V_{O2}$ deviates from a reference voltage, or whether both the first output voltage $V_{O1}$ and the second output voltage $V_{O2}$ deviate from a reference voltage.

In one embodiment of the present invention, when the first output voltage $V_{O1}$ or the second output voltage $V_{O2}$ deviates from the reference voltage, the control circuit 120 is configured to postpone turning off the corresponding secondary power switch, i.e., to extend an ON time length of the corresponding secondary power switch. The more a deviation is, the longer an extension of the ON time length is.

In one embodiment of the present invention, the primary winding T0, the first secondary winding T1 and the second secondary winding T2 are magnetically coupled to each other at a transformer T.

In one embodiment of the present invention, the main power switch Q0 may comprises a controllable power switch, such as MOSFET, IGBT, BJT, etc. The first secondary power switch Q1 and the second secondary power switch Q2 may respectively comprise a controllable power switch and a power diode coupled in parallel, or the first secondary power switch Q1 and the second secondary power switch Q2 may both comprise a controllable power switch.

In one embodiment of the present invention, if the first output voltage $V_{O1}$ and the second output voltage $V_{O2}$ both deviate from the reference voltage, the control circuit 120 is configured to detect which one deviates more, and to extend the ON time length of the corresponding secondary power switch with more deviation. The higher the deviation is, the longer the extension of the ON time length is.

In one embodiment of the present invention, the switching mode power supply may comprise a flyback converter, or a forward converter, or other appropriate converters. The control circuit 120 may perform secondary side control, which uses the information from the secondary side of the transformer (e.g., a current flowing through the first secondary power switch and/or through the second secondary power switch, the first output voltage, the second output voltage, and etc.) to control the power switches. In other embodiments of the present invention, the control circuit 120 may also perform primary side control; and the main power switch should be controlled to be OFF during the first secondary power switch or the second secondary power switch's extended ON time, so as to avoid shoot through.

In one embodiment of the present invention, the deviation may comprise a positive deviation, which means the first output voltage $V_{O1}$ or the second output voltage $V_{O2}$ shifts higher than the reference voltage.

Figure 2:
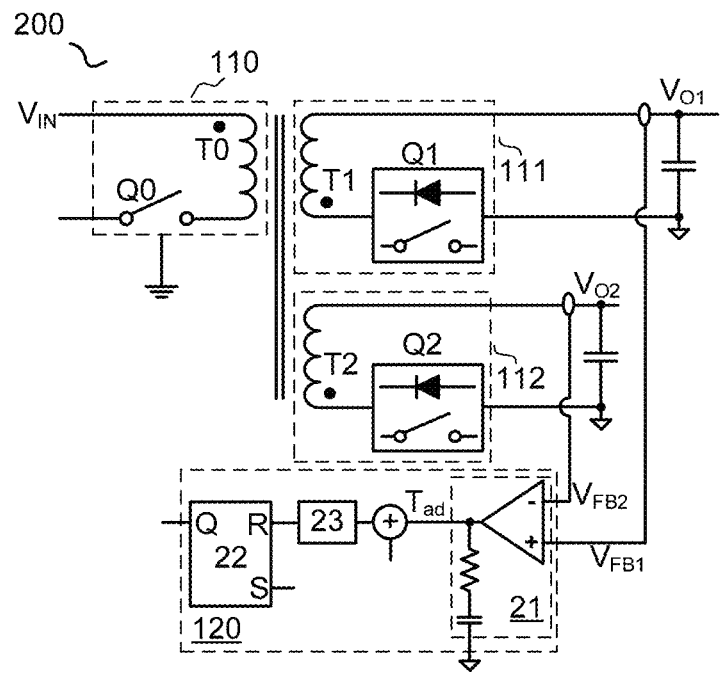
FIG. 2 schematically shows a switching mode power supply 200 with a circuit configuration of the control circuit 120 in accordance with an embodiment of the present invention.

In one embodiment of the present invention, a first feedback voltage and a second feedback voltage is respectively derived from the first output voltage $V_{O1}$ and the second output voltage $V_{O2}$ by way of voltage division; and the voltage deviation may be detected through comparison with the two feedback voltages, as shown in FIG. 2. FIG. 2 schematically shows a switching mode power supply 200 with a circuit configuration of the control circuit 120 in accordance with an embodiment of the present invention. Specifically, in the example of FIG. 2, the control circuit 120 comprises: an operational amplifier circuit 21, configured to perform a proportional-integral operation on a difference of the first feedback voltage $V_{FB1}$ and the second feedback voltage $V_{FB2}$, to generate an adjust signal $T_{ad}$; and a logical circuit 22, configured to extend the ON time length of the first secondary power switch Q1 and/or the second secondary power switch Q2 in response to the adjust signal $T_{ad}$. The so-called proportional-integral operation means the operational amplifier circuit is configured to amplify the difference between the first feedback voltage $V_{FB1}$ and the second feedback voltage $V_{FB2}$, and to integrate an amplified signal to generate the adjust signal $T_{ad}$.

In one embodiment of the present invention, the adjust signal $T_{ad}$ is added to an ON time circuit 23 (e.g. via an adder), to control the ON time length of the first secondary power switch Q1 and/or the second secondary power switch Q2 by way of the logical circuit 22, so that when the first output voltage $V_{O1}$ and/or the second output voltage $V_{O2}$ deviates from the reference voltage, the control circuit 120 is configured to postpone turning off the first secondary power switch Q1 and/or the second secondary power switch Q2. That is, the adjust signal $T_{ad}$ is delivered to the logical circuit 22 by way of the ON time circuit 23.

Figure 3:
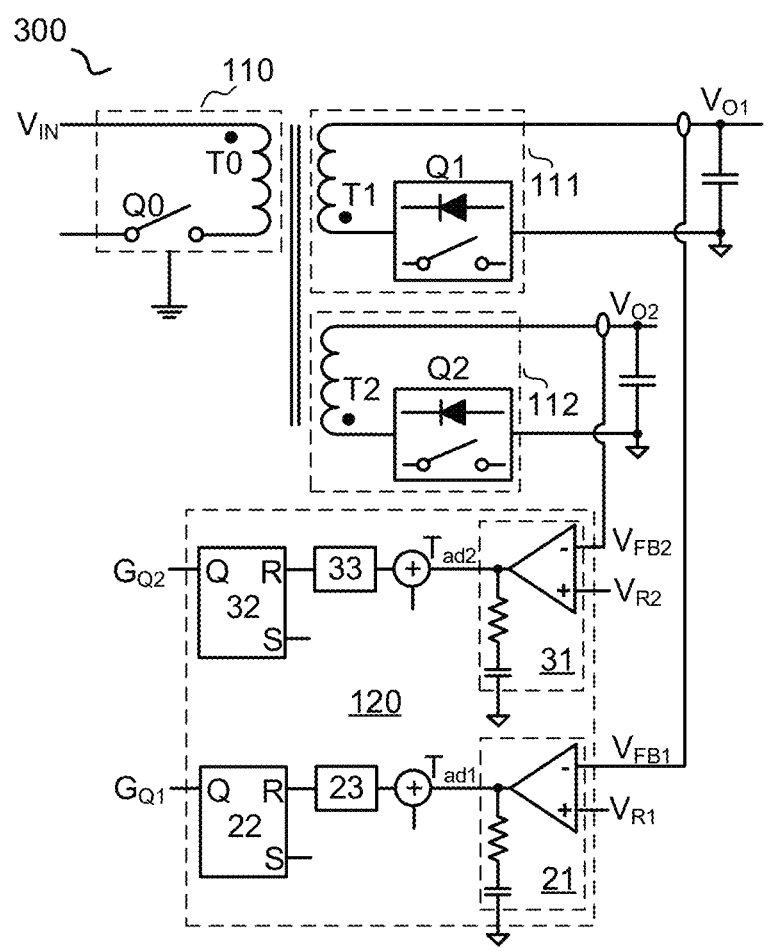
FIG. 3 schematically shows a switching mode power supply 300 with a circuit configuration of the control circuit 120 in accordance with an embodiment of the present invention.

In one embodiment of the present invention, the first output voltage $V_{O1}$ and the second output voltage $V_{O2}$ may have a same reference voltage. In other embodiments of the present invention, they may have different reference voltages. For example, the first output voltage $V_{O1}$ may be associated with a first reference voltage $V_{R1}$, and the second output voltage $V_{O2}$ may be associated with a second reference voltage $V_{R2}$; i.e., they are respectively compared with their own voltage references to detect the voltage deviation, as shown in FIG. 3. FIG. 3 schematically shows a switching mode power supply 300 with a circuit configuration of the control circuit 120 in accordance with an embodiment of the present invention. Specifically, in the example of FIG. 3, the control circuit 120 comprises: a first operational amplifier circuit 21, a second operational amplifier circuit 31, a first logical circuit 22, and a second logical circuit 32. The first operational amplifier circuit 21 is configured to detect whether the first feedback voltage $V_{FB1}$ deviates from the first reference voltage $V_{R1}$, to generate a first adjust signal $T_{ad1}$. The second operational amplifier circuit 31 is configured to detect whether the second feedback voltage $V_{FB2}$ deviates from the second reference voltage $V_{R2}$, to generate a second adjust signal $T_{ad2}$. The first logical circuit [12]22 is configured to generate a first control signal $G_{Q1}$ in response to the first adjust signal $T_{ad1}$, to control the first secondary power switch Q1. The second logical circuit 32 is configured to generate a second control signal $G_{Q2}$ in response to the second adjust signal $T_{ad2}$, to control the second secondary power switch Q2.

In one embodiment of the present invention, the first adjust signal $T_{ad1}$ is added to a first ON time circuit 23, to control the ON time length of the first secondary power switch Q1 by way of the first logical circuit 22, so that when the first output voltage $V_{O1}$ deviates from the first reference voltage $V_{R1}$, the ON time length of the first secondary power switch Q1 is extended. The second adjust signal $T_{ad1}$ is added to a second ON time circuit 33, to control the ON time length of the second secondary power switch Q2 by way of the second logical circuit 32, so that when the first output voltage $V_{O1}$ deviates from the first reference voltage $V_{R1}$, the ON time length of the first secondary power switch Q1 is extended.

Figure 4:
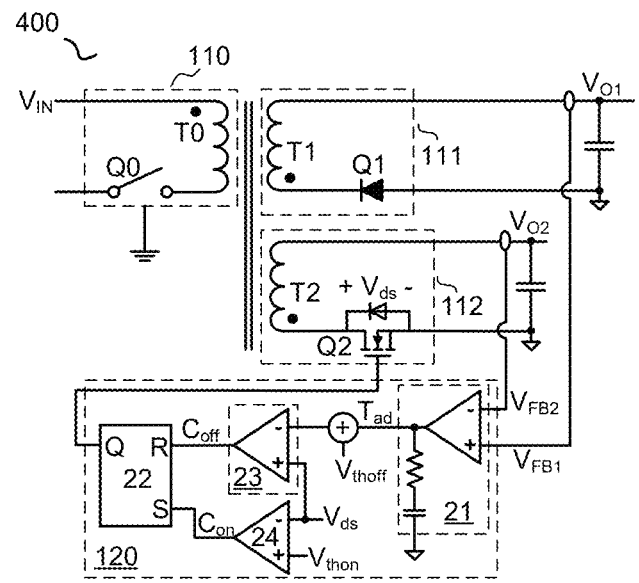
FIG. 4 schematically shows a switching mode power supply 400 in accordance with an embodiment of the present invention.

In one embodiment of the present invention, a signal indicative of a voltage across the first secondary power switch Q1 or across the second secondary power switch Q2 is compared with a corresponding threshold voltage to determine the ON and OFF actions of the first secondary power switch Q1 and/or the second secondary power switch Q2, as shown in FIG. 4. FIG. 4 schematically shows a switching mode power supply 400 in accordance with an embodiment of the present invention. In the example of FIG. 4, the first secondary power switch Q1 comprises a power diode; and the second secondary power switch Q2 comprises a power MOSFET. The ON time circuit 23 comprises: an OFF comparator, configured to compare a sum of an off voltage threshold $V_{thoff}$ and the adjust signal $T_{ad}$ with a signal (e.g., a voltage $V_{ds}$) indicative of the voltage across the second secondary power switch Q2, to generate an off control signal $C_{off}$ which is operable to control a turning-off action (e.g. a turning-off time point) of the second secondary power switch by way of the logical circuit 22. That is, the second secondary power switch is configured to be turned off in response to the off control signal $C_{off}$ by way of the logical circuit 22.

If the second output voltage $V_{O2}$ shifts high, which causes the second feedback voltage $V_{FB2}$ to be higher than the first feedback voltage $V_{FB1}$, the operational amplifier circuit 21 would generate the adjust signal $T_{ad}$ with a positive value, which is added to the off threshold $V_{thoff}$ to postpone the generation of the off control signal $C_{off}$. Accordingly, the second secondary power switch Q2 is turned off late.

In the example of FIG. 4, the control circuit 120 further comprises: an ON comparator 24, configured to compare the voltage across the second secondary power switch Q2 with an ON threshold $V_{thon}$, to generate an on control signal $C_{on}$, which is operable to control a turning-on time point of the second secondary power switch by way of the logical circuit 22.

Figure 5:
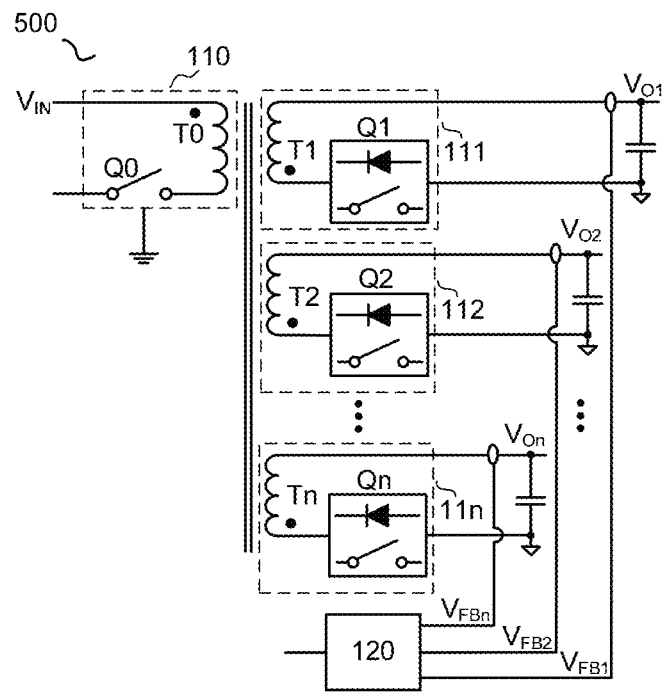
FIG. 5 schematically shows a switching mode power supply 500 in accordance with an embodiment of the present invention.

Several embodiments of the foregoing switching mode power supply comprise two secondary power switches (i.e. two outputs) in the secondary side. However, one skilled in the art should realize that the switching mode power supply may comprise a plurality of secondary power switches in the secondary side, and may have multiple outputs, as shown in FIG. 5. FIG. 5 schematically shows a switching mode power supply 500 in accordance with an embodiment of the present invention. Specifically, in the example of FIG. 5, the switching mode power supply 500 comprises: a primary circuit 110, configured to receive an input voltage $V_{IN}$, the primary circuit 110 having a main power switch Q0 coupled to a primary winding T0; n secondary circuits 111-11n, configured to respectively provide an output voltage ($V_{O1}$-$V_{on}$), wherein n is an integer equal to or higher than 2, and each of the n secondary circuits having a secondary power switch (Q1-Qn) coupled to a corresponding secondary winding (T1-Tn); and a control circuit 120, configured to detect whether one or more of the n output voltages $V_{O1}$-$V_{on}$ deviate from a reference voltage.

The main power switch Q0 may comprises a controllable secondary power switch, and each of the secondary power switches Q1-Qn may comprise a controllable secondary power switch or a power diode.

In one embodiment of the present invention, if one of the output voltages deviates from the reference voltage, the control circuit 120 is configured to extend the ON time length of the corresponding secondary power switch; and the more the deviation is, the longer the extension of the ON time length is.

In one embodiment of the present invention, if more than one outputs deviate from the reference voltage, the control circuit 120 is configured to extend the ON time lengths of all of the corresponding secondary power switches; and the one with more deviation would have a longer extension of the ON time length.

Figure 6:
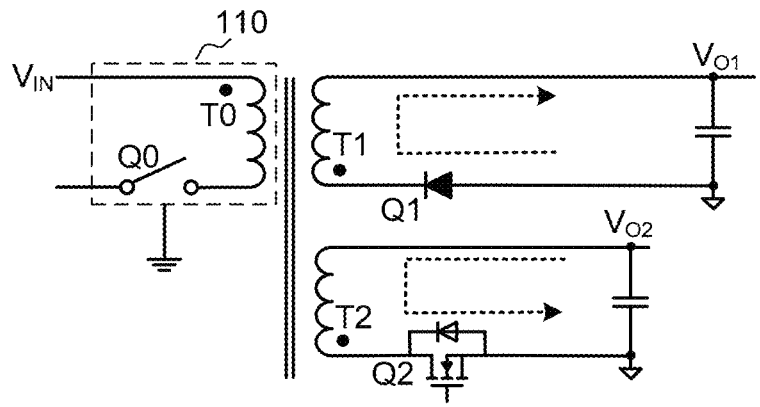
FIG. 6 schematically shows a current/energy flowing when one of the secondary power switch is postponed being turned off in the switching mode power supply in accordance with an embodiment of the present invention.

During the operation of the switching mode power supplies discussed hereinbefore, if the load goes lighter in one output, the corresponding output voltage goes higher. If the output voltage goes too high to deviate from the reference voltage, the operational amplifier circuit is operable to generate the adjust signal to the logical circuit, to postpone turning off the corresponding secondary power switch, so that the secondary power switch maintains ON when the current flowing therethrough reaches zero, and the energy in this output is delivered to other outputs through the transformer. As shown in FIG. 6, when the second output voltage $V_{O2}$ shifts high, the second secondary power switch Q2 is turned off late, causing the current flowing through the second secondary circuit 112 to go reversely, to deliver the energy in the second output $V_{O2}$ to the first output $V_{O1}$ via the second secondary winding T2 and the first secondary winding T1. That is, the residual power in the second output is delivered to other outputs. Thus, the power balance is realized.

Figure 7:
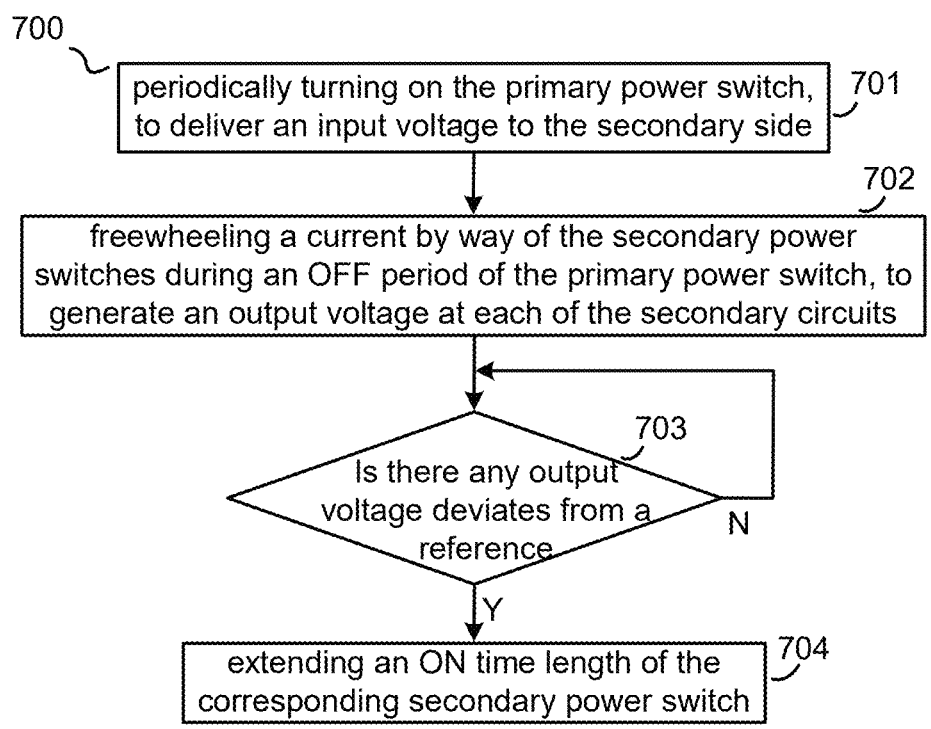
FIG. 7 schematically shows a flowchart 700 of a method used in a switching mode power supply in accordance with an embodiment of the present invention.

FIG. 7 schematically shows a flowchart 700 of a method used in a switching mode power supply in accordance with an embodiment of the present invention. The switching mode power supply includes a transformer, a primary circuit coupled to a primary side of the transformer, and a plurality of secondary circuits coupled in parallel with each other at a secondary side of the transformer. The primary circuit has a primary power switch, and each of the secondary circuits has a secondary power switch. The method comprising:

Step 701, periodically turning on the primary power switch, to deliver an input voltage to the secondary side.

Step 702, freewheeling a current by way of each of the secondary power switches during an OFF period of the primary power switch, to generate an output voltage at each of the secondary circuits.

Step 703, monitoring each of the output voltages to detect whether there is an output voltage or more than one output voltages deviate from a reference voltage, if there is, entering step 704.

Step 704, extending an ON time length of the corresponding secondary power switch (i.e. postponing turning off the corresponding secondary power switch).

In one embodiment of the present invention, the more the deviation is, the longer the extension of the ON time length is.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

What is claimed is:

1. A switching mode power supply, comprising:
   a primary circuit, configured to receive an input voltage, the primary circuit having a main power switch coupled to a primary winding of a transformer;
   a first secondary circuit, configured to provide a first output voltage, the first secondary circuit having a first secondary power switch coupled to a first secondary winding of the transformer;
   a second secondary circuit, configured to provide a second output voltage, the second secondary circuit having a second secondary power switch coupled to a second secondary winding of the transformer; and
   a control circuit, configured to detect whether the first output voltage or the second output voltage deviates from a reference voltage, or whether both the first output voltage and the second output voltage deviate from the reference voltage, to control both first and second output voltages to deliver energy in bidirectional way to each other whenever one of the first and second output voltages deviates from the reference voltage; wherein
   if the first output voltage and the second output voltage both deviate from the reference voltage, the control circuit is further configured to detect which one shifts higher than the reference voltage more, and to extend an ON time length of the corresponding secondary power switch.

2. The switching mode power supply of claim 1, wherein:
   the control circuit is configured to detect which one of the first and second output voltages deviates, and extend the ON time length of a corresponding secondary power switch of the one with a deviation, so as to deliver an energy in the one with the deviation to the other with no deviation; and wherein:
   the more the deviation is, the longer an extension of the ON time length is.

3. The switching mode power supply of claim 1, wherein the control circuit comprises:
   a first operational amplifier circuit, configured to detect whether a first feedback voltage indicative of the first output voltage deviates from a first reference voltage, to generate a first adjust signal;
   a second operational amplifier circuit, configured to detect whether a second feedback voltage indicative of the second output voltage deviates from a second reference voltage, to generate a second adjust signal;
   a first logical circuit, configured to generate a first control signal in response to the first adjust signal, to control the first secondary power switch; and
   a second logical circuit, configured to generate a second control signal in response to the second adjust signal, to control the second secondary power switch.

4. The switching mode power supply of claim 3, wherein the control circuit further comprises:
   a first ON time circuit, wherein the first adjust signal is delivered to the first logical circuit by way of the first ON time circuit; and
   a second ON time circuit, wherein the second adjust signal is delivered to the second logical circuit by way of the second ON time circuit.

5. A switching mode power supply, comprising:
   a primary circuit, configured to receive an input voltage, the primary circuit having a main power switch coupled to a primary winding of a transformer;
   a first secondary circuit, configured to provide a first output voltage, the first secondary circuit having a first secondary power switch coupled to a first secondary winding of the transformer;
   a second secondary circuit, configured to provide a second output voltage, the second secondary circuit having a second secondary power switch coupled to a second secondary winding of the transformer; and
   a control circuit, configured to detect whether the first output voltage or the second output voltage deviates from a reference voltage, or whether both the first output voltage and the second output voltage deviate from the reference voltage, to control both first and second output voltages to deliver energy in bidirectional way to each other whenever one of the first and second output voltages deviates from the reference voltage;
   wherein the control circuit comprises:
   an operational amplifier circuit, configured to perform a proportional-integral operation on a difference of a first feedback voltage indicative of the first output voltage and a second feedback voltage indicative of the second output voltage, to generate an adjust signal; and
   a logical circuit, configured to extend an ON time length of the first secondary power switch and/or the second secondary power switch in response to the adjust signal.

6. The switching mode power supply of claim 5, wherein the control circuit further comprises:
   an ON time circuit, wherein the adjust signal is delivered to the logical circuit by way of the ON time circuit.

7. The switching mode power supply of claim 6, wherein the ON time circuit comprises:
   an OFF comparator, configured to compare a sum of an off voltage threshold and the adjust signal, with a signal indicative of a voltage across the first secondary power switch or across the second secondary power switch, to generate an off control signal, to control a turn-off action of the first secondary power switch or the second secondary power switch by way of the logical circuit.

8. A switching mode power supply, comprising:
   a primary circuit, configured to receive an input voltage, the primary circuit having a main power switch coupled to a primary winding of a transformer;
   n secondary circuits, configured to respectively provide an output voltage, wherein n is an integer equal to or higher than 2, and wherein each of the n secondary circuits has a secondary power switch coupled to a corresponding secondary winding of the transformer; and
   a control circuit, configured to detect whether one or more of the n output voltages deviate from a reference voltage, to control all of the n output voltages to deliver energy in bidirectional way to each other whenever one of the n output voltages deviates from the reference voltage; wherein
   if more than one outputs shifts higher than the reference voltage, the control circuit is configured to extend ON time lengths of all of the corresponding secondary power switches.

9. The switching mode power supply of claim 8, wherein:
   the control circuit is configured to detect which one of the n output voltages deviates, and extend the ON time length of a corresponding secondary power switch of the one with a deviation, to deliver an energy in the one with the deviation to others with no deviation; and wherein:

the more the deviation is, the longer an extension of the ON time length is.

10. The switching mode power supply of claim 8, wherein:

the more the output voltage shifts higher than the reference voltage, the more the ON time length of the corresponding secondary power switch is extended.

* * * * *